(12) United States Patent
Sugden et al.

(10) Patent No.: US 6,821,635 B2
(45) Date of Patent: Nov. 23, 2004

(54) RUBBER MODIFIED MONOVINYLIDENE AROMATIC POLYMER BLENDS WITH IMPROVED TRANSPARENCY

(75) Inventors: John L. Sugden, Midland, MI (US); Phillip A. Wagner, Bay City, MI (US)

(73) Assignee: Dow Global Technologoies Inc., Midland, MI (US)

(*) Notice: Subject to any disclaimer, the term of this patent is extended or adjusted under 35 U.S.C. 154(b) by 66 days.

(21) Appl. No.: 10/370,341

(22) Filed: Feb. 19, 2003

(65) Prior Publication Data

US 2003/0149183 A1 Aug. 7, 2003

Related U.S. Application Data

(63) Continuation-in-part of application No. 09/957,399, filed on Sep. 19, 2001, now abandoned.
(60) Provisional application No. 60/239,382, filed on Oct. 11, 2000.

(51) Int. Cl.$^7$ .......................... B32B 27/08; B32B 27/32; C08L 53/00

(52) U.S. Cl. ...................... 428/519; 428/515; 428/521; 525/71; 525/86; 525/95

(58) Field of Search ................................. 428/515, 519, 428/521; 525/71, 55, 63, 69, 70, 86, 88, 95

(56) References Cited

U.S. PATENT DOCUMENTS

| | | | |
|---|---|---|---|
| 5,166,238 A | 11/1992 | Nakano et al. | |
| 5,491,195 A | 2/1996 | Schrader et al. | |
| 6,011,117 A | 1/2000 | Perkins et al. | |
| 6,221,471 B1 | * 4/2001 | Salmang et al. | ............ 428/220 |

FOREIGN PATENT DOCUMENTS

JP    06023820 A    2/1994

* cited by examiner

*Primary Examiner*—James J. Seidleck
*Assistant Examiner*—Thao Tran

(57) ABSTRACT

The present invention is a blend of a monovinylidene aromatic polymer, a rubber modified monovinylidene aromatic polymer, and a monovinyl aromatic-conjugated diene copolymer, which can be used to produce cost effective, transparent packaging materials with a good toughness, which materials can be produced using conventional thermoforming equipment. The blend comprises:

a) from 49 to 70 weight percent based on the total weight of the blend, of a monovinylidene aromatic polymer having a weight average molecular weight (Mw) of from 210,000 to 400,000 and a melt flow of less than 12.0 g/10 min.;

b) from 20 to 50 weight percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron; and c) a monovinyl aromatic-conjugated diene copolymer, wherein: (i) the rubber and rubbery component in the rubber modified monovinylidene aromatic polymer and the monovinyl aromatic-conjugated diene copolymer range from 3 to 10 weight percent based on the total weight of the blend A; and (ii) the amount of the monovinyl aromatic-conjugated diene copolymer is less than 7 weight percent, based on the total weight of the blend A.

9 Claims, No Drawings

RUBBER MODIFIED MONOVINYLIDENE AROMATIC POLYMER BLENDS WITH IMPROVED TRANSPARENCY

CROSS REFERENCE STATEMENT

This application is a continuation-in-part of U.S. application Ser. No. 09/957,399 filed Sep. 19, 2001 which claims the benefit of U.S. Provisional Application No. 60/239,382 filed Oct. 11, 2000.

BACKGROUND OF THE INVENTION

The present invention relates to blends of rubber modified monovinylidene aromatic polymers.

Rubber modified monovinylidene aromatic polymers, such as high impact polystyrene (HIPS), have found numerous applications which require high impact strength. One application wherein HIPS is typically used is food packaging products which specifically require good impact strength and transparent properties. Although toughness is achieved by HIPS resins, the transparency of thermoformed articles, such as thermoformed cups, is achieved using an expensive HIPS product having rubber particles with a specific capsule morphology.

Numerous attempts have been made to acquire the necessary balance of toughness and transparency in thermoformed articles using various materials and techniques. Transparent resins, such as polystyrene, polyethylene terephthalate and polypropylene have been used to produce transparent packaging via in-line thermoforming. However, each of these materials have certain drawbacks: polystyrene is too brittle, polyethylene terephthalate is relatively expensive and difficult to process requiring relatively long cycle time, and polypropylene has limited processability in that thermoformed articles therefrom demonstrate poor dimensional stability.

Transparent packaging has also been made using optical grade general purpose polystyrene (GPPS) which is oriented to obtain a balance of clarity and toughness. However, such products can only be obtained to a maximum sheet thickness of 0.75 mm due to process constraints, which is not thick enough for some thermoforming applications. Polyvinylchloride has also been used to produce transparent packaging, but is thermally unstable and undesirable for food packaging.

Blends of a GPPS and a styrene-butadiene (S-B) copolymer generally offer a good balance of clarity and toughness, however, such blends have certain limitations, because S-B copolymer is relatively expensive and forms gels when extruded at temperatures in excess of 215° C. Maintaining the extrusion temperature below 215° C. typically results in lower output rates and higher conversion costs. In addition, GPPS and S-B copolymer blends are often associated with poor taste and odor properties when used in food packaging.

A good balance of clarity and toughness can also be obtained by blends of a GPPS having molecular weight from about 260,000 to 400,000 and a HIPS, when sheet or film made from such blends are used to form certain articles, such as a drinking cup, at a forming temperature below 144° C. and draw ratios of 0.4 to 1.5. However, lower forming temperature often results in final articles having poor geometric definition resulting in poor handling thereof, such as stacking and lip rolling during the fabrication of drinking cups.

Therefore, there remains a need for polymers which can produce cost effective transparent packaging, which can be used in food packaging and non-food packaging markets, and can be produced by conventional thermoforming lines.

SUMMARY OF THE INVENTION

The present invention is a blend of a monovinylidene aromatic polymer, a rubber modified monovinylidene aromatic polymer, and monovinyl aromatic-conjugated diene copolymer which can be used to produce cost effective, transparent packaging that can be used in food packaging and non-food packaging markets, and can be produced using conventional thermoforming equipment. The blend (blend A) comprises:

a) from 49 to 70, preferably 60, weight percent based on the total weight of the blend, of a monovinylidene aromatic polymer having a weight average molecular weight (Mw) of from 210,000 to 400,000 and a melt flow rate of less than 12.0 g/10 min.;

b) from 20 to 50, preferably 36, weight percent based on the total weight of the blend, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron; and c) a monovinyl aromatic-conjugated diene copolymer, wherein:

i) the rubber and rubbery component in the rubber modified monovinylidene aromatic polymer and the monovinyl aromatic-conjugated diene copolymer range from 3 to 10 weight percent, preferably 5.4 weight percent, based on the total weight of the blend A; and ii) the amount of the monovinyl aromatic-conjugated diene copolymer is less than 7 weight percent, based on the total weight of the blend A.

In a preferred embodiment of the present invention, a multilayer sheet or film has two layers comprising a layer of one polymer blend (A) and a second layer of another polymer blend (B), or three layers comprising a core or middle layer of one polymer blend (A) and an outer or capping layer (B) located on each side of the core or middle layer. More specifically, the two-layer film or sheet comprises:

a) from 2 to 30, preferably 5, percent of the total thickness of the film or sheet, of two outer layers of a blend (blend B) comprising:

1) from 0 to 50, preferably 0, weight percent based on the total weight of the blend B, of a monovinylidene aromatic polymer having a weight average molecular weight (Mw) of from 170,000 to 325,000 and a melt flow of less than 18.0 g/10 min.;

2) from 50 to 100, preferably 96, weight percent based on the total weight of the blend B, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron; and 3) from 0 to 10, preferably 4, weight percent based on the total weight of the blend B, of a monovinyl aromatic-conjugated diene copolymer; and b) from 70 to 98, preferably 95, percent of the total thickness of the film or sheet of a blend (blend A) comprising:

1) from 49 to 70, preferably 60, weight percent based on the total weight of the blend A, of a monovinylidene aromatic polymer having a weight average molecular weight (Mw) of from 210,000 to 400,000 and a melt flow of less than 12.0 g/10 min.;

2) from 10 to 50, preferably 36, weight percent based on the total weight of the blend A, of a rubber modified monovinylidene aromatic polymer comprising a monovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron; and 3) from 1 to 10, preferably 4, weight percent based on the total weight of the blend A, of a monovinyl aromatic-conjugated diene copolymer;

wherein:

i) the rubber and rubbery component in the rubber modified monovinylidene aromatic polymer and the monovinyl aromatic-conjugated diene copolymer range from 3 to 10 weight percent, preferably 5.4 weight percent, based on the total weight of the two-layer film or sheet;

ii) the amount of the monovinyl aromatic-conjugated diene copolymer is less than 7 weight percent, based on the total weight of the two-layer film or sheet; and iii) the amount of the monovinylidene aromatic polymer having a weight average molecular weight (Mw) of from 210,000 to 400,000 and a melt flow rate of less than 12.0 g/10 min. is at least 34 weight percent, based on the total weight of the two-layer film or sheet.

Another preferred embodiment of the present invention is a three-layer film or sheet comprising:

a) from 2 to 15, preferably 5, percent each of the total thickness of the film or sheet, of two outer layers of blend B; and from 70 to 96, preferably 90, percent of the total thickness of the film or sheet of the core or middle layer of blend A, wherein:

i) the rubber and rubbery component in the rubber modified monovinylidene aromatic polymer and the monovinyl aromatic-conjugated diene copolymer range from 3 to 10 weight percent, preferably 5.4 weight percent, based on the total weight of the three-layer film or sheet;

ii) the amount of the monovinyl aromatic-conjugated diene copolymer is less than 7 weight percent, based on the total weight of the three-layer film or sheet; and iii) the amount of the monovinylidene aromatic polymer having a weight average molecular weight (Mw) of from 210,000 to 400,000 and a melt flow rate of less than 12.0 g/10 min. is at least 34 weight percent, based on the total weight of the three-layer film or sheet.

The three-layer film may have balanced or symmetrical configuration having identical thickness of each outer layer, or unbalanced or asymmetrical configuration having two outer layers of differing thickness.

The blends A and B of the present invention can also be used to produce mono-layer sheet or film using conventional extrusion, blow molding or blown film techniques. The sheet or film can be used to prepare transparent packaging materials which are cost effective and have good impact properties.

The clarity and toughness balance of formed articles, such as drinking cups, fabricated from any of the sheet structures made from the blends of the present invention described herein can further be enhanced. More specifically, by extruding a suitable thickness of a layer of a monovinylidene aromatic polymer having a melt flow rate of 6 to 18 g/10 minute, more preferably 8 to 18 g/10 min., and most preferred 10 to 16 g/min. on the exterior surface of the co-extruded sheet or film (i.e., the surface which does not come in contact with any material to be packaged in the formed article) a final article fabricated or formed from such enhanced—multilayer sheet or film can exhibit improved Gardner gloss and "sparkle appearance" making such article more appealing to the human eye.

In another embodiment of the present invention the blend of the present invention is used in a multilayer sheet which also comprises layers of a high or low density polyolefin, an adhesion modified polyolefin, and ethylene vinyl alcohol.

DETAILED DESCRIPTION OF THE INVENTION

In one embodiment, the present invention is a blend of a monovinylidene aromatic polymer, a rubber modified monovinylidene aromatic polymer, and a monovinyl aromatic-conjugated diene copolymer.

Monovinylidene aromatic polymers are produced by polymerizing vinyl aromatic monomers such as those described in U.S. Pat. Nos. 4,666,987, 4,572,819 and 4,585,825, which are herein incorporated by reference. Preferably, the vinyl aromatic monomer is of the formula:

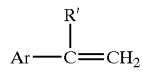

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof.

The monovinylidene aromatic polymers used in the blend A of the present invention has a typical Mw of from 210,000 to 400,000 and a melt flow rate of less than 12.0 g/10 min. Typically the Mw is from 210,000, preferably from 235,000, more preferably from 250,000 and most preferably from 280,000 to 400,000, preferably to 375,000, more preferably to 350,000 and most preferably to 325,000. The melt flow rate is typically less than 12.0, preferably less than 9.0, more preferably less than 5.0, and most preferably less than 2.0 g/10 min.

The monovinylidene aromatic polymers used in the blend B of the present invention has a typical Mw of from 170,000 to 325,000 and a melt flow rate of less than 18.0 g/10 min. Typically the Mw is from 170,000, preferably from 190,000, more preferably from 210,000 and most preferably from 240,000 to 325,000, preferably to 315,000, more preferably to 305,000 and most preferably to 290,000. The melt flow rate is typically less than 18.0, preferably less than 16.0, more preferably less than 14.0, and most preferably less than 12.0 g/10 min.

The blend of the present invention also comprises a rubber modified monovinylidene aromatic polymer. Rubber modified monovinylidene aromatic polymers are produced by polymerizing vinyl aromatic monomers in the presence of a predissolved elastomer, examples of which are described in U.S. Pat. Nos. 3,123,655, 3,346,520, 3,639,522, and 4,409,369, which are incorporated by reference herein. In particular, a preferred rubber modified monovinylidene aromatic polymer used in the blends of the present invention and the method for making, is disclosed in U.S. Pat. No. 4,428,106 and U.S. Pat. No. 5,491,195, which are incorporated herein by reference.

Typically, the rubber modified monovinylidene aromatic polymer comprises from about 92 to about 55 weight percent based on the total weight of the polymer composition, of a monovinylidene aromatic polymer matrix and, dispersed within said matrix, from about 8 to about 45 weight percent of grafted and occluded 1,3-alkadiene-based rubber particles, said particles being composed, on a rubber particle weight basis, of:

from 25 to about 100 weight percent of rubber particles having a capsule morphology and a volume average particle size of from 0.1 to 0.4 micron.

Typically, the free (i.e., ungrafted) monovinylidene aromatic polymer matrix formed during polymerization will have a weight averaged molecular weight (Mw) of from about 130,000 to about 250,000 (preferably from about 150,000 to about 220,000); a number averaged molecular weight (Mn) from about 40,000 to about 100,000 (preferably from about 45,000 to about 75,000); and Mw:Mn ratio of from about 2 to about 5 (preferably from about 2.2 to about 3.5).

Rubber materials which are suitable for use in the rubber modified monovinylidene aromatic polymers of the present invention include rubbery 1,3-alkadiene polymers having a second order transition temperature of 0° C., or less, preferably −20° C. or less. Suitable rubbers include 1,3-alkadiene homopolymers and copolymers containing, in polymerized form and on a elastomeric polymer weight basis, from 60 to 100 percent of a 1,3-alkadiene monomer, such as butadiene, isoprene, and from 0 to 40 weight percent of one or more monoethylenically unsaturated comonomers such as styrene, acrylonitrile, alpha-methylstyrene, methacrylonitrile, methyl methacrylate, ethyl acrylate and the like. Preferred rubbers include 1,3-alkadiene/monovinylidene aromatic such as 1,3-butadiene/styrene block copolymer rubbers which contain from 60 to 85 weight percent of the 1,3-alkadiene monomer block copolymerized with from 15 to 40 weight percent of one or more monovinylidene aromatic monomers.

The typical rubber content of the rubber modified monovinylidene aromatic polymer of the present invention is from 5, preferably from 8, more preferably from 10 and most preferably from 12 to 30, preferably to 25, more preferably to 20 and most preferably to 18 weight percent, based on the total weight of the rubber modified monovinylidene aromatic polymer composition.

The dispersed, grafted and occluded rubber particles will typically have, per one part by weight of the raw material ungrafted rubber, from about 0.5 to about 4 or 5 (preferably from 1 or 1.5 to about 3 or 4) parts by weight of monovinylidene aromatic polymer grafted thereto and occluded therein. Accordingly, the total or combined weight of the grafted and occluded rubber particles (i.e., including polymerized, grafted and occluded monovinylidene aromatic polymer portions thereof) will typically constitute from about 10 to about 45 (preferably 15 or 20 to about 35, 40 or 45) weight percent of the overall rubber modified polymer composition with the remainder thereof (i.e., about 55 to about 90, preferably from about 55, 60 or 65 to about 75 or 80, weight percent) being free (i.e., non-grafted and non-occluded) matrix material.

In a preferred embodiment the rubber particles of the rubber modified monovinylidene aromatic polymer comprises:

i. from 25 to about 100 weight percent of rubber particles having a capsule morphology and a volume average particle size of from 0.1 to 0.4 micron; and ii. from about 75 to about 0 weight percent of rubber particles having an entanglement morphology and having a volume average particle size of from about 0.25 to 1 micron.

As used herein, the term capsule morphology refers to known small rubber particles that have a morphology which is commonly also referred to in the art as "single occlusion" or "core/shell" morphology. Similarly, the term "entanglement morphology" refers to various known non-cellular rubber particle morphologies that are commonly referred to in the art as "entanglement", "labyrinth", "coil", "onion skin" or "concentric circle" morphology. The volume average particle size refers to the diameter of the rubber particles, including all occlusions of vinyl aromatic polymer within the rubber particles. Volume average particle sizes and distributions can be measured using conventional techniques such as a Coulter Counter™ or, transmission electron microscopy image analysis.

The rubber particles having capsule morphology will typically range in size from 0.05 micron to 1 micron with the overall volume averaged size taken over all capsule particles being from 0.1 to 0.4 micron. Preferably, the volume average particle size is from 0.2 to 0.35 micron. These particles typically constitute from 25 to 100, generally from 25 to 95, preferably from 25 to 80, more preferably from 25 to 65 and most preferably from 25 to 40 weight percent of the total weight of the rubber particles contained within the polymer matrix.

Entanglement morphology rubber particles can range from 0.2 to 3 microns and generally have a volume average particle size from 0.25 to 1 micron. Preferably such entanglement particles have a volume average particle size of from 0.3 or 0.35 to 0.8 micron. These particles typically constitute from 0 to 75, generally from 5 to 75, preferably from 20 to 75, more preferably from 35 to 75, and most preferably from 50 to 75 weight percent of the total weight of the rubber particles contained within the polymer matrix.

The rubber modified monovinylidene aromatic polymers used in the blend of the present invention can additionally contain other rubber particle sizes and morphologies, including cellular or multiple occlusion type morphologies. In another preferred embodiment, the rubber modified monovinylidene aromatic polymer will further comprise in addition to the capsule and entanglement morphology particles, from about 1 to about 25, preferably from 2 to 15 weight percent, based on the total weight of the particles, particles having a volume average particle size of 0.6 to 8 microns. Typically the volume average particle size is from 0.6, preferably from 0.8, more preferably from 1.0 and most preferably from 1.2 to 6, preferably to 6, more preferably to 2 and most preferably to 1.5 microns. These larger particles typically have a cellular or multiple occlusion type morphology. In a preferred embodiment, cellular particles are present having a volume average particle size of from 0.8 to 1 micron.

Monovinyl aromatic-conjugated diene copolymers useful in this invention are block copolymers derived from a monovinyl substituted aromatic compound and a conjugated diene. These include such block copolymers as the types AB, ABA, tapered AB and ABA, and copolymers with varying degrees of coupling including branched or radial (AB)n and (ABA)n copolymers, where A represents a polymerized monovinyl aromatic compound and B represents a polymerized conjugated diene, and "n" is a whole number greater than 2. Other resinous block copolymers with different sequences of A and B blocks are also contemplated as useful in the present invention. The monovinvi aromatic-conjugated diene block copolymer has a monovinyl aromatic monomer content of from 15 to 60 weight percent, based on the total weight of the block copolymer.

The A blocks could be polymerized styrene, alpha-methylstyrene, 4-methylstyrene, 3-methylstyrene, 2-methylstyrene, 4-ethylstyrene, 3-ethylstyrene, 2-ethylstyrene, 4-tertbutylstyrene, 2,4-dimethylstyrene and condensed aromatics such as vinyl naphthalene and mixtures thereof. Presently preferred is styrene. The rubbery B block could be polybutadiene, polypentadiene, a random or tapered monovinyl aromatic/conjugated diene copolymer, polyisoprene, a random or tapered monovinyl aromatic-isoprene copolymer, or mixtures thereof. Presently preferred is butadiene and/or isoprene.

The preferred styrene-butadiene or styrene-isoprene-styrene block copolymer has a molecular weight of from about 40,000 to about 170,000, and more preferably of from 50,000 to about 150,000, with a styrene content of from about 15 percent by weight to 60 percent by weight, and more preferably from about 25 percent by weight to 50 percent by weight. Preferred types include ABA or mixtures of ABA and AB, where A is a polystyrene block and B is a block of butadiene or isoprene.

Such block copolymers and methods for their production are well known in the art, and are described in G. Holden, et al; THEMOPLASTIC ELASTOMERS $2^{ND}$ EDITION; Hanser/Gardner Publications, Inc., 1996, ISBN 1-56990-205-4, pages 48-70. They are also described in H. Hsieh and R. Quirk, ANIONIC POLYMERIZATION: PRINCIPLES AND PRACTICAL APPLICATIONS, Marcel Dekker Inc., 1996, ISBN 0-8247-9523-7, pages 307-321, and 475-516.

There are many possibilities to acquire the desirable weight percentages of polybutadiene, the monovinyl aromatic-conjugated diene copolymer, and Mw of monovinyl aromatic polymer by altering the weight percentages of each polymeric component or in the case of multi-layer sheet altering the thickness of each layer and the weight percentages of each polymeric component within each layer.

Further, the blend of the present invention typically comprises from 1 to 10 wt. percent of monovinyl aromatic-conjugated diene copolymer, preferably from 1 to 6, more preferably from 2 to 5 and most preferred from 2 to 4 percent based on the total weight of the blend.

Other additives may be included in the blend of the present invention such as mineral oil, other plasticizers and the like.

The blend is typically prepared by dry blending the polymers in the appropriated proportions prior to extrusion, although any method of blending can be utilized to produce extruded sheets.

In cases where the blend undergoes in line thermoforming, the blend can contain a lower amount of polybutadiene because the edges of the extruded sheet remain warm as it enters the pin chains avoiding cracking along the edges.

In another aspect of the present invention the blend is used to prepare multilayer sheets or films. In a preferred embodiment, the multilayer sheet or film has three layers comprising a core or middle layer of one polymer blend and an outer layer located on each side of the core or middle layer of another blend as further defined hereinabove.

Alternatively, other polymers can be used as outer capping layers including other monovinylidene aromatic polymers and rubber modified monovinylidene aromatic polymers, provided however, i) the rubber and rubbery component in the rubber modified monovinylidene aromatic polymer and the monovinyl aromatic-conjugated diene copolymer range from 3 to 10 weight percent, preferably 5.4 weight percent, based on the total weight of the multi-layer film or sheet;

ii) the amount of the monovinyl aromatic-conjugated diene copolymer is less than 7 weight percent, based on the total weight of the multi-layer film or sheet; and iii) the amount of the monovinylidene aromatic polymer having a weight average molecular weight (Mw) of from 210,000 to 400,000 and a melt flow rate of less than 12.0 g/10 min. is at least 34 weight percent, based on the total weight of the multi-layer film or sheet.

Surprisingly, thermoformed articles prepared from the above multilayer sheet or film, such as cups, are transparent allowing see-through inspection of any materials contained by such thermoformed articles.

The multilayer sheet or film can be produced using known techniques in the art such as multilayer extrusion and blow molding.

Multilayer sheet thicknesses are typically from 0.2 to 3.175 millimeters (mm) preferably from 0.8 to 2.54 mm, more preferably from 1.0 to 2.0 mm, and most preferred from 1.27 to 1.5.

Multilayer sheets can be further processed by thermoforming into articles which have good impact strength and transparency. Thicknesses of less than 0.2 mm can also be achieved and used in applications where thin gauge materials are desired, such as transparent lids.

Film thicknesses are typically from 0.012 to 0.06 mm, preferably from 0.018 more preferably from 0.020 and most preferably from 0.023 to 0.05, preferably to 0.04, more preferably to 0.03 and most preferably to 0.025 mm.

The thickness of the multilayer sheets and films is typically comprised of from 70 to 96 percent, based on the total thickness of the sheet or film, of a core layer of the blend A of the present invention, preferably from 75, more preferably from 80 and most preferably from 85 to 96, preferably to 92, more preferably to 90 and most preferably to 87 percent, and from 4 to 30 percent, based on the total thickness of the sheet or film of at least one outer layer of blend B, preferably from 25, more preferably from 20 and most preferably from 15 to 4, preferably to 8, more preferably to 10 and most preferably to 13 percent. In embodiments wherein blend B is used as two outer layers in a three layer structure, the thickness defined above is a combined thickness of the blend B layers.

The multilayer sheets can be produced by the flat die/calendering coextrusion process. This sheet can then be thermoformed by standard plug and mold thermoforming machines to make preformed containers, or by form-fill-seal lines. This multilayer sheet can be used to produce form-fill-seal packaging having good transparency, barrier and toughness properties, as well as preformed packages or containers by standard thermoforming equipment.

A preferred embodiment of the present invention is a three-layer sheet or film comprising a core or middle layer of the blend A of the present invention and two outer capping layers of blend B, as recited previously, located on each side of the core or middle layer, wherein the total, combined amount of monovinyl aromatic-conjugated diene copolymer in blends B and A in the film or sheet comprises from 1 to 7 weight percent, based on the total weight of the film or sheet, and wherein each outer layer comprises a thickness of up to 15, preferably up to 10 and most preferably up to 5 percent of the total thickness of the three-layer sheet or film and the core or middle layer comprises a total thickness of at least 70, preferably 80 and most preferably 90 percent of the total thickness of the three-layer sheet or film. The three-layer film may have balanced or symmetrical configuration having identical thickness of each outer layer, or unbalanced or asymmetrical configuration having two outer layer of differing thickness.

Multi-layer structures visual appearance can be further enhanced by extruding a layer of monovinyl aromatic polymer having a MFR of than 18.0 g/10 minute, a Mw ranging from 170,000 to 260,000, and a Vicat softening point of less than 102° C. onto the outside of the sheet when after thermoforming it appears on the outside of the cup. The addition of the monovinyl aromatic polymer improves Gardner gloss giving the final article a more "sparkling" appearance.

In another embodiment of the present invention the blend of the present invention is used in a multilayer sheet which also comprises layers of a high or low density polyolefin, an adhesion modified polyolefin, and ethylene vinyl alcohol. Preferably the multilayer sheet is a five layer sheet having the following layers, a high or low density polyolefin/an adhesion modified polyolefin/ethylene vinyl alcohol/an adhesion modified polyolefin/the blend of the first aspect of the present invention blend A, in the stated order. In this embodiment the high or low density polyolefin is preferably a low density polyethylene having a density of less than 0.924 g/cm3. The multilayer sheet of this embodiment is typically from about 0.85 to about 1.8 mm thick, however thinner sheets can be produced for applications of smaller packages or applications requiring less demanding barriers.

The high or low density polyolefin layer is typically from about 5 to 20 percent, preferably from about 12 to 18 percent of the total multilayer sheet thickness. The adhesion modified polyolefin is a polyolefin such as polyethylene or polypropylene, which has been modified with functional groups such as vinyl acetate, butyl acetate, maleic anhydride or acrylic acid to promote adhesion. Preferably, the adhesion modified polyolefin is Admer™, available from Mitsui Petrochemical. These layers are typically from about 0.025 to 0.075 mm thick per side, preferably from about 0.030 to about 0.040 mm per side and the combined layers being from about 6 to 10 percent of the total multilayer sheet thickness. Blend A of the present invention is as described previously and is preferably a 10 to 70 percent by weight of the monovinylidene aromatic polymer, 29 to 89 percent by weight a rubber modified monovinylidene aromatic polymer, and a 1 to 10 percent monovinyl aromatic-conjugated diene copolymer. This layer is typically to about 55 to 83 percent of the total multilayer sheet thickness. The ethylene vinyl alcohol copolymer layer serves as a barrier against the permeability to oxygen and is typically a copolymer containing from about 32 to 38 percent of an ethylene component and from about 62 to 68 percent by weight of a vinyl alcohol component. Polyamides and polyvinylidene chlorides can also be used as the barrier polymer. This layer is typically from 6 to 15 percent, preferably from about 10 to 12 percent of the total multilayer sheet thickness.

The multilayer sheets of the present invention are typically thermoformed at high speeds using well known techniques such that the polymers are oriented and the thermoformed articles exhibit transparent properties. The thermoforming temperature is typically below 156° C. and is preferably between 145 and 150° C., while the drawing speed (strain rate) is generally above 250 mm/second, and is preferably between 285 and 295 mm/second. Depending on the thickness of the sheet, it typically has haze values of 30 to 100 percent prior to thermoforming with haze values of 2 to 30 percent once thermoforming is complete. The haze and transparency values were determined with a Hunter Lab Tristimulus Colorimeter Model D25P-9 with glass test standard numbered 425 in accordance with ASTM Method D1003-92.

Thermoformed articles prepared using this process are surprisingly transparent when the draw down ratio of the article is at least 0.4. The draw down ratio is the ratio of the height of the article to the diameter of the cross sectional area. The draw down ratio is typically 0.4 to 1.8, preferably 0.6 to 1.6 and most preferably 0.8 to 1.4.

The following examples are provided to illustrate the present invention. The examples are not intended to limit the scope of the present invention and they should not be so interpreted.

EXAMPLE 1

A three-layer, co-extruded sheet was prepared for testing by using three different polymer blends further described herein. The polymer blend B1 for the first layer was prepared by dry-blending at room temperature of 95 weight percent, based on the total weight of blend B1, of a rubber-modified high impact polystyrene, XU 70025.00, a product of The Dow Chemical Company, and 5 weight percent of a styrene-butadiene-styrene block copolymer, DPX 507, a product of Dexco Polymers, a product of Dow/ExxonMobil Partnership. The polymer blend A1 for the second layer was prepared in a similar manner using 55.4 weight percent, based on the total weight of blend A1, of general purpose polystyrene, BASF 147F, a product of BASF A.G., 38 weight percent of XU 70025.00, and 4.5 weight percent of DPX 507. In addition, the blend A1 also contained a 2.1 weight percent of color tint. 100 percent of XU 70025.00 (B2) was used for the third layer. A co-extruded sheet having a thickness of 1.4 mm was prepared at melt temperature of about 210° C. using blends B1 and A1 and XU 70025.00 (B2) on a conventional co-extrusion line equipped with three separate extruders and feed-hoppers. The co-extruded sheet was then thermoformed into about 450 ml (16 Oz.) drinking cups using a conventional, commercial-scale continuous roll feed thermoforming process maintaining a minimum sheet temperature 145° C. and a maximum sheet temperature of 156° C. during forming to realize optimum balance of cup definition, clarity and toughness.

TABLE 1

Key properties of Thermoformed Cups

| | |
|---|---|
| Average Thickness | 0.254 mm |
| % Haze | 10 |
| % Transparency | 73 |
| Toughness | No brittle cups per 64 tested |

Toughness is measured by counting the total number of brittle cups obtained by placing the bottom of one cup inside of a second cup at the same plane as the rim of the second cup and manually squeezing the rim of the second cup until it touches the bottom diameter of the first cup. If the second cup breaks as it is squeezed against the bottom diameter of the first cup, it is counted as a brittle cup.

EXAMPLE 2

A three-layer, co-extruded sheet was prepared for testing by using three different polymer blends further described herein. The polymer blend B3 for the first layer was prepared by dry-blending at room temperature of 98 weight percent, based on the total weight of blend B3, of a rubber-modified high impact polystyrene, XU 70025.00, a product of The Dow Chemical Company, and 2 weight percent of a styrene-butadiene-styrene block copolymer, DPX 507, a product of Dexco Polymers, a product of Dow/ExxonMobil Partnership. Blend B3 also contained a color tint, Transparent Blue CS72222-FDAT, a product of The Ferro Corporation. The polymer blend A2 for the second layer was prepared in a similar manner using 60 weight percent, based on the total weight of blend A2, of general purpose polystyrene, STYRON 685D, a product of The Dow Chemical Company, 38 weight percent of XU 70025.00, and 2.0 weight percent of DPX 507. 100 percent of XU 70025.00 (B2) was used for the third layer. 100 percent of STYRON 615APR, a product of The Dow Chemical Company was used for an external capping layer that would appear on the outside of a 450 ml. (16 ounce) drink cup. A co-extruded sheet having a thickness of 1.5 mm was prepared at melt temperature of about 210° C. using blends B3 and A2, XU 70025.00 (B2), and STYRON 615APR on a conventional co-extrusion line equipped with four separate extruders and feed-hoppers. The co-extruded sheet was then thermoformed into about 450 ml (16 Oz.) drinking cups using a conventional, commercial-scale continuous roll feed thermoforming process maintaining a minimum sheet temperature 145° C. and a maximum sheet temperature of 156° C. during forming to realize optimum balance of cup definition, clarity and toughness. The extruded sheet percent haze was 90.6 at 1.54 mm thickness.

TABLE 2

Key properties of Thermoformed Cups

| | |
|---|---|
| Average Thickness | 0.335 mm |
| % Haze | 15.2 |
| Toughness | No brittle cups per 64 tested |

What is claimed is:

1. A polymer blend (A) comprising:
    a) from 49 to 70 weight percent based on the total weight of the blend, of a monovinylidene aromatic polymer having a weight average molecular weight (Mw) of from 210,000 to 400,000 and a melt flow of less than 12.0 g/10 mm.;
    b) from 20 to 50 weight percent based on the total weight of the blend, of a rubber modified monovinylidene aromatic polymer comprising a moriovinylidene aromatic polymer matrix having rubber particles dispersed therein, wherein the rubber particles comprise, based on the total weight of the rubber particles, from 25 to 100 weight percent rubber particles having a capsule morphology and a volume average particle size of from 0.1 to 0.4 microns; and from 75 to 0 weight percent rubber particles having an entanglement morphology having a volume average particle size of from 0.25 to 1 micron; and
    c) a monovinyl aromatic-conjugated diene block copolymer having a monovinyl aromatic monomer content of from 15 to 60 weight percent, based on the total weight of the block copolymer,
    wherein:
    i) the rubber and rubbery component in the rubber modified monovinylidene aromatic polymer and the monovinyl aromatic-conjugated diene block copolymer range from 3 to 10 weight percent based on the total weight of the blend; and
    ii) the amount of the monovinyl aromatic-conjugated diene block copolymer is less than 7 weight percent, based on the total weight of the blend.

2. The blend of claim 1 wherein the monovinylidene aromatic polymer of a) is polystyrene.

3. The blend of claim 1 wherein the rubber modified monovinylidene aromatic polymer further comprises up to 75 weight percent, based on the total weight of the rubber particles, rubber particles having an entanglement morphology and a volume average particle size of from 0.25 to 1 micron.

4. The blend of claim 3 wherein the rubber modified monovinylidene aromatic polymer further comprises from 1 to 25 weight percent, based on the total weight of the rubber particles, rubber particles having a cellular morphology and a volume average particle size of from 0.6 to 8 micron.

5. The blend of claim 1 wherein the monovinylidene aromatic polymer of a) has a Mw of from 280,000 to 325,000 and a melt flow rate of from 2 to 12.0 g/10mm.

6. The blend of claim 1 wherein the monovinylidene aromatic polymer of a) is about 60 weight percent, the rubber modified monovinylidene aromatic polymer of b) is from 30 to 40 weight percent, and the monovinyl aromatic-conjugated diene block copolymer of c) is from 2 to 5 weight percent based on the total weight of the blend.

7. A sheet produced from the blend A of claim 1 having a total thickness of from 0.2 to 1.6 mm.

8. A film produced from the blend A of claim 1 having a total thickness of from 0.012 to 0.06 mm.

9. A thermoformed article produced from a sheet or film produced from blend A of claim 1.

* * * * *